A. P. MASON.
Horse Collar Caps.
No. 124,444. Patented March 12, 1872.
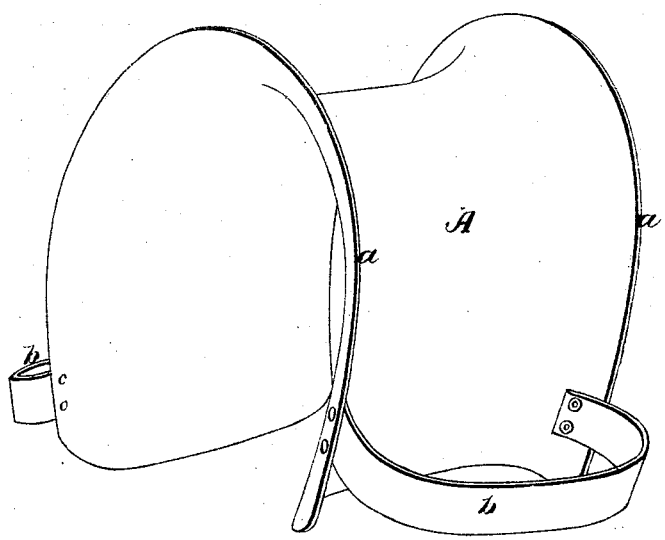
Witnesses.
C. F. Brown
Melville Church
Inventor.
Arnold P. Mason,
by Geo. E. Brown,
Atty.

UNITED STATES PATENT OFFICE.

ARNOLD P. MASON, OF FRANKLINVILLE, ASSIGNOR OF TWO-THIRDS OF HIS RIGHT TO WM. H. BARD, OF SAME PLACE, AND GILBERT W. STRONG, OF MACHIAS, NEW YORK.

IMPROVEMENT IN HORSE-COLLAR CAPS.

Specification forming part of Letters Patent No. 124,444, dated March 12, 1872.

Specification describing an Improved Collar-Cap, invented by ARNOLD P. MASON, of Franklinville, Cattaraugus county, New York.

1. This invention relates to collar-caps—that is, caps whose function is to be interposed between the necks of horses and their collars, for the purpose of preventing the latter from chafing the skin. The invention consists in such a cap as an article of manufacture, made of one piece of unoiled sole-leather.

2. The figure is a perspective view of my invention.

3. A is the cap, formed with the usual flanges $a$, and having loops $b$ fastened to it to help retain the collar. The cap A is made of one piece of unoiled sole-leather, which, after being thoroughly wetted, is first pressed in a mold to form the flanges $a$, and then subjected to pressure to give it the bow form shown in Fig. 2. When dry it is sufficiently rigid to retain a permanent shape.

4. Sole-leather, being tanned in hemlock or oak, and neither oiled nor blacked, preserves the medicinal properties derived from the bark, and is consequently healing and toughening to the skin of the horse.

I claim as my invention—

As an article of manufacture, a collar-cap, made of one piece of unoiled sole-leather, as specified.

ARNOLD P. MASON.

Witnesses:
  WM. H. BARD,
  R. C. BARD.